United States Patent [19]

Araki

[11] Patent Number: 5,034,874
[45] Date of Patent: Jul. 23, 1991

[54] PWM CONVERTER APPARATUS

[75] Inventor: Hiroshi Araki, Aichi, Japan

[73] Assignee: Mitsubishi Denki Kabushiki Kaisha, Japan

[21] Appl. No.: 519,774

[22] Filed: May 7, 1990

[30] Foreign Application Priority Data

May 29, 1989 [JP] Japan .................. 1-132847

[51] Int. Cl.$^5$ .............................................. H02M 7/68
[52] U.S. Cl. ......................................... 363/41; 363/37; 363/80; 363/127
[58] Field of Search ..................... 363/79, 37, 53, 80, 363/81, 87, 127; 318/803

[56] References Cited

U.S. PATENT DOCUMENTS

| 3,551,778 | 12/1970 | Ekström | 363/79 |
| 4,652,770 | 3/1987 | Kumano | 307/66 |
| 4,749,932 | 6/1988 | Yonemoto | 318/759 |
| 4,816,985 | 3/1989 | Tanahashi | 363/81 |
| 4,847,744 | 7/1989 | Araki | 363/49 |

FOREIGN PATENT DOCUMENTS 59-194697  11/1984  Japan .

Primary Examiner—William H. Beha, Jr.
Assistant Examiner—Bruce Dunn
Attorney, Agent, or Firm—Leydig, Voit & Mayer

[57] ABSTRACT

A PWM converter apparatus having phase detection means including an error detection protection device for outputting an estimate value as a present phase signal when a phase signal in each computation cycle deviates for a predetermined value or more from the estimate value obtained according to the former phase signal, the frequency of a power voltage, and a computation cycle.

5 Claims, 4 Drawing Sheets

PWM CONVERTER APPARATUS

FIELD OF THE INVENTION

The present invention relates to a PWM converter apparatus for controlling a DC voltage output of a power converter, and more specifically to a PWM converter apparatus for preventing phases of a power voltage from being incorrectly detected so as to precisely control the DC voltage and for preventing switching elements in the power converter from being damaged due to an overcurrent.

PRIOR ART

FIG. 4 is a block diagram showing a conventional PWM converter apparatus for driving a motor for an elevator which is disclosed in Japanese Patent Provisional Publication No. SHO 59-194697 and so forth.

In the figure, an AC power supply (1) supplies a three-phase AC power consisting of phase U, phase V and phase W. A power converter 3 is connected to a power supply terminal of each phase via a reactor 2.

The power converter 3, consisting of transistors 3a to 3f as switching elements and diodes 3g to 3l as switching elements, forms a PWM converter. The transistors 3a to 3f and the diodes 3g to 3l form three pairs of transistors and three pairs of diodes, respectively. To each contact of the first transistor pair 3a and 3b and the first diode pair 3g and 3h, a phase U power is supplied. To each contact of the second transistor pair 3c and 3d and the second diode pairs 3i and 3j, a phase V power is supplied. To each contact of the third transistor pair 3e and 3f and the third diode pair 3k and 3l, a phase W power is supplied. Between each transistor pair and each diode pair of the power converter 3, a smoothing condenser 4 for smoothing a DC voltage E, a voltage detector 5 for detecting the DC voltage E, a power converter (inverter) for converting the DC voltage E into a three-phase AC power, and a load including a three-phase induction motor driven via the inverter are connected.

For each phase, a current transformer 7 for detecting an input current I supplied from the AC power supply 1 to the power converter 3 is provided between the reactor 2 and the power converter 3. In addition, a transformer 8 for detecting a power voltage Vo is provided between the AC power supply 1 and the reactor 2. In this structure, assuming that the output of each phase of the AC power supply 1 is ideally balanced, the transformer 8 is provided only at the supply terminal of phase U. However, it is possible to provide the transformer 8 at the supply terminal of each phase.

Control means 10 for opening and closing the transistors 3a to 3f in the power converter 3 in synchronization with the power voltage Vo is provided with a zero phase detector 11 for detecting a zero phase $\phi_0$ of the power voltage Vo, a PLL (phase synchronous loop) oscillator 12 for detecting the phase of the power voltage Vo according to the zero phase $\phi_0$ and for outputting a phase signal $\phi$, a sine wave generator 13 for generating a three-phase sine wave signal G according to the phase signal $\phi$, a voltage commander 14 for generating an output voltage command E. of the DC voltage E, a subtracter 15 for obtaining the difference between the DC voltage E and the output voltage command E* and for outputting a voltage deviation $\Delta E$, a voltage control device 16 for computing a current command I. of the input current I for each phase according to the sine wave signal G and the voltage deviation $\Delta E$, a subtracter 17 for obtaining the difference between the current command I and the input current I and for outputting a current deviation $\Delta I$ for each phase, a current control device 18 for computing an input voltage command Vo* according to the current deviation $\Delta I$, and a PWM signal generation circuit 19 for generating a PWM signal P which controls the transistors according to the input voltage command Vo*.

In the figure, the zero phase detection means 11 and the PLL oscillator 12 comprise phase detection means for the power voltage Vo. The reactor 2, the current transformer 7, the sine wave signal G, the current command I*, the subtracter 17, the current deviation $\Delta I$, the current control device 18, the input voltage command Vo , the PWM signal generation circuit 19, and the PWM signal P of phase U are same as those of other phases. Thus, they are numbered only for phase U.

By referring to FIG. 4, the operation of a conventional PWM converter apparatus is described in the following.

The transformer 8 obtains the power voltage Vo as a voltage signal which is in synchronization with the output of the AC power supply 1 and inputs it to the zero phase detector 11 of the control means 10. On the other hand, the transformer 7 obtains the three-phase input current I for each phase and inputs it to each subtracter 17 of the control means 10. The voltage detector 5 detects the DC voltage E which is output from the power converter 3 and inputs it to the subtracter 15 of the control means 10.

In the control means 10, the zero phase detector 11 detects the zero phase $\phi_0$ of the power voltage Vo. The PLL oscillator 12 outputs the phase signal $\phi$ of the power voltage Vo according to the zero phase $\phi_0$. Thus, the sine wave generator 13 generates a three-phase sine wave signal G which synchronizes with the phase of the power voltage Vo according to the phase signal $\phi$. The subtracter 15 generates the voltage deviation $\Delta E$ between the output voltage command E* and the DC voltage E. The voltage control device 16 computes the current command I* using the sine wave signal G and the output voltage deviation $\Delta E$. The subtracter 17 generates the current deviation $\Delta I$ between the current command I* and the input current I. The current control device 18 computes an input voltage command V* using the current deviation $\Delta I$. The PWM signal generation circuit 18 generates a PWM signal P for each phase according to the input voltage command V* and applies it to the base of each of the transistors 3a to 3f.

Thus, a predetermined DC voltage E which is PWM controlled is supplied to the load 6 and the three-phase induction motor for driving an elevator is driven, for example.

In conventional PWM converter apparatuses, the control means 10 computes the current command I using the phase signal $\phi$ from the PLL oscillator 12 and accordingly outputs the PWM signal P. Thus, if the PLL oscillator 12 and so forth malfunction due to noise and thereby incorrectly reads the phase of the power voltage Vo and outputs the phase signal o incorrectly detected, the current control device 18 outputs the input voltage command V* for the power voltage Vo in an incorrect phase. Therefore, the PWM signal P becomes unstable and it is difficult to precisely control the power converter 3a. In addition, an over current may cause the transistors 3a to 3f to be damaged. To prevent the over current from occurring, the apparatus becomes expensive.

SUMMARY OF THE INVENTION

An object of the present invention is to solve such problems, that is, to prevent an abnormal phase signal due to an error detection from being output and transistors from being damaged due to an over current, thereby providing an inexpensive PWM converter apparatus with highly precise control performance.

A PWM converter apparatus according to the present invention is provided with phase detection means including an error detection protection device for outputting an estimate value as a present phase signal when a phase signal in each computation cycle deviates from a predetermined value from the estimate value obtained according to the former phase signal, the frequency of a power voltage, and a computation cycle.

In accordance with the present invention, when an error detection is determined according to an incorrect phase signal being read in each computation cycle, the estimate value obtained from the computation is treated as the present phase signal.

DETAILED DESCRIPTION OF THE PREFERRED EMBODIMENTS

Figure 1:
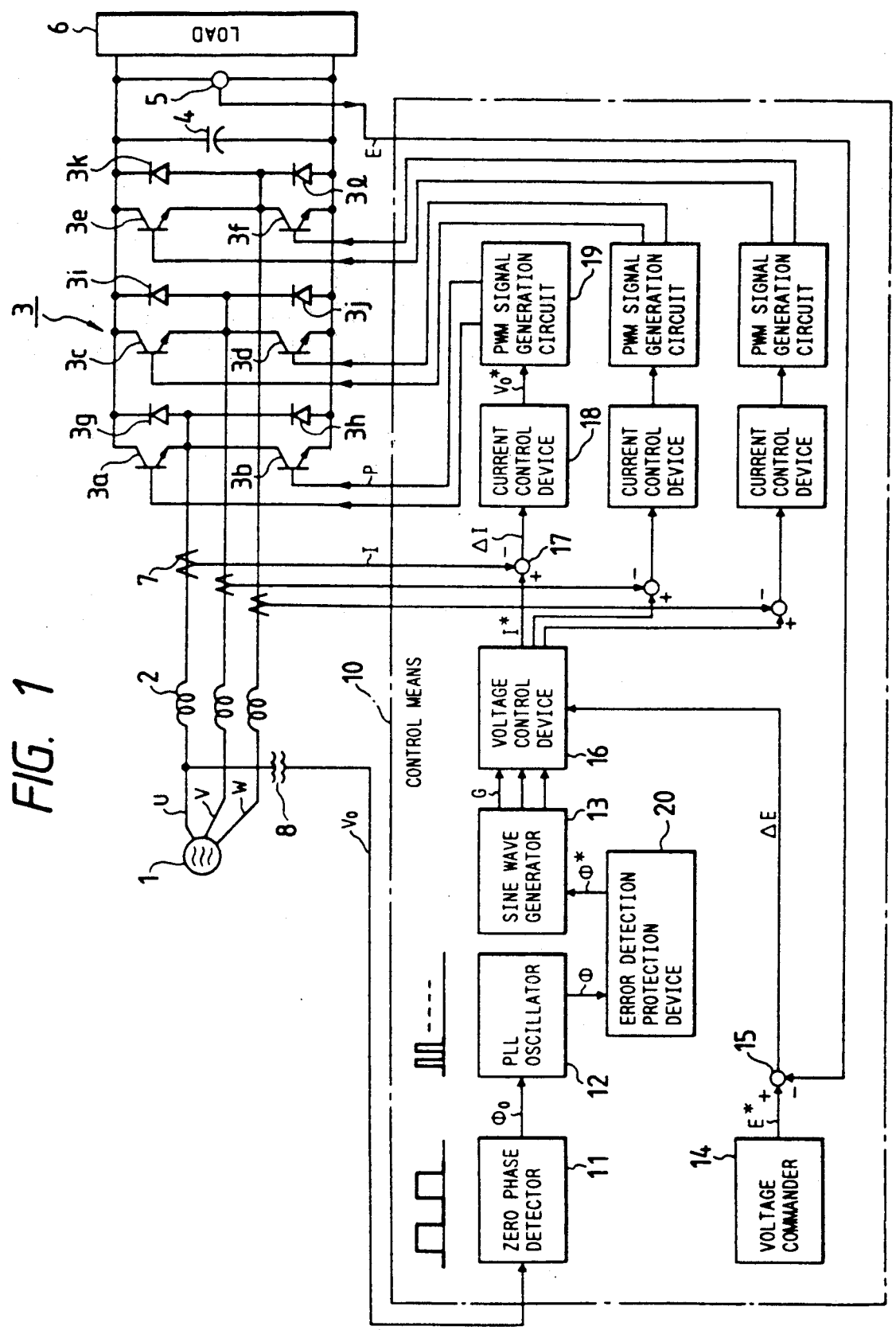
FIG. 1 is a block diagram showing an embodiment of the present invention.

FIG. 1 is a block diagram showing an embodiment of the present invention.

Figure 4:
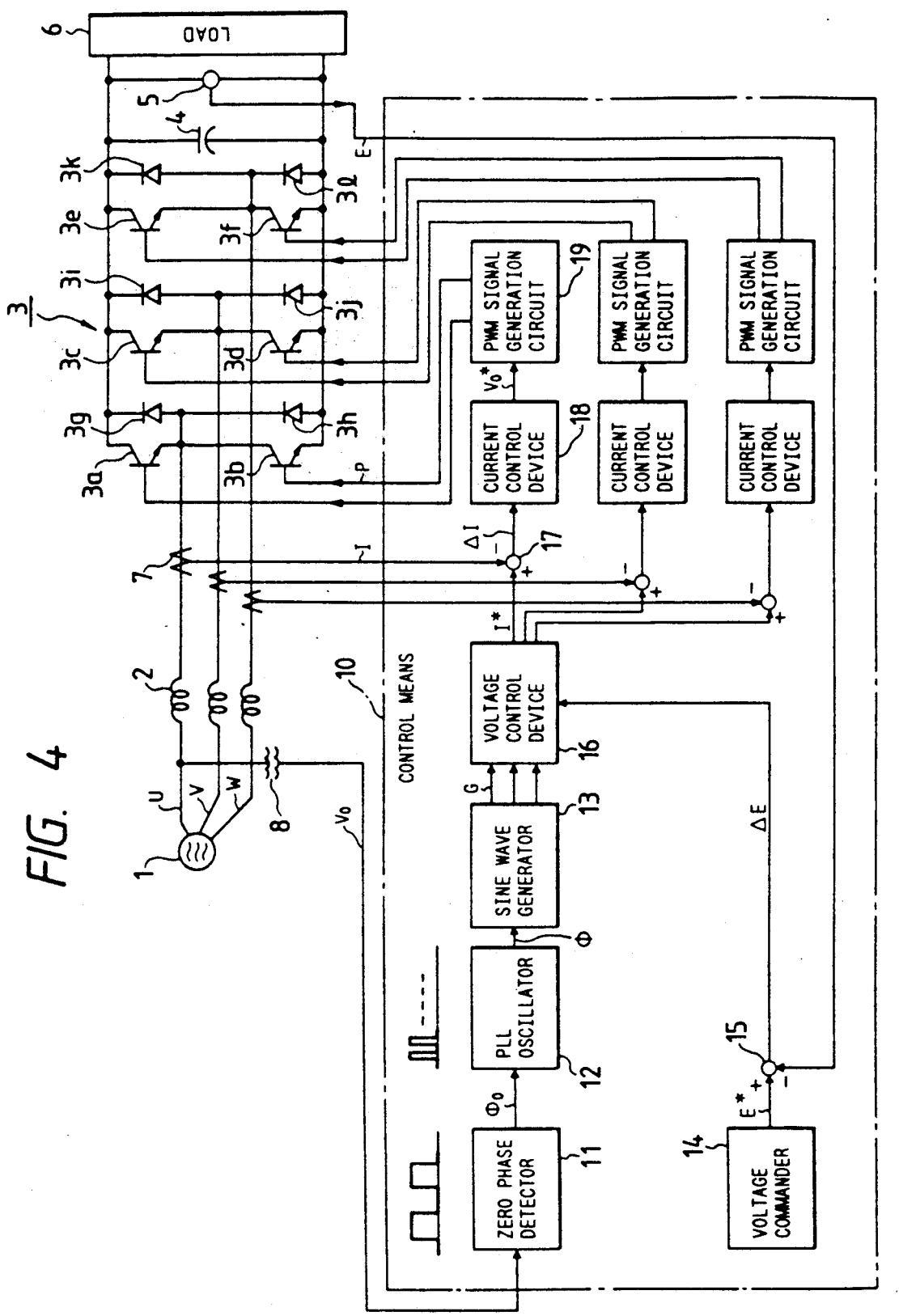
FIG. 4 is a block diagram showing a conventional PWM converter apparatus.

Reference numerals 1 to 8 and 10 to 19 of FIG. 4 are sam-e as those of FIG. 1.

An error detection protection device 20 placed between the PLL oscillator 12 and the sine wave generator 13 comprises a phase detection means along with the zero phase detector 11. When the phase detection means determines that the phase signal $\phi$ from the PLL oscillator 12 is incorrectly detected, it outputs the estimate value as the present phase signal $\phi^*$.

The error detection protection device 20 is normally structured with software. It is shown with a functional block diagram shown in FIG. 2. The error detection protection device 20 is provided with a counter 21 for counting the phase signal $\phi$ which is input from the PLL oscillator 12 and for outputting the phase signal $\phi(t)$ in each computation cycle, a memory 22 for storing the phase signal 1-- (t−1) obtained in the former computation cycle (hereinafter named the former phase signal), a subtracter 23 for obtaining the difference between the phase signal $\phi(t)$ being read in each computation cycle and the former phase signal $\phi(t−1)$ and for outputting an increment $\Delta\phi(t)$, an estimate incremental arithmetic unit 24 for generating an estimate increment $\Delta\phi(t)^*$ in each computation cycle according to the frequency fv of the power voltage Vo and the computation cycle t, an adder 25 for adding the former phase signal $\Delta(t−1)$ and the estimate increment $\Delta\phi(t)^*$, a subtracter 26 for outputting the absolute value of the difference between the increment $\Delta\phi(t)$ and the estimate increment $\Delta\phi(t)^*$ as an incremental deviation $|\Delta\phi|$, a comparator 27 for comparing the incremental deviation $|\Delta\phi|$ with a predetermined value $|\Delta\phi|^*$, and a selection circuit 28 for outputting the output of the counter 21 or the adder 25 as the present phase signal $\phi^*$ according to a comparison output D from the comparator 27.

The output $[\phi(t-1)+\Delta\phi(t)^*]$ of the adder 25 is the estimate value of the phase signal $\phi(t)$ obtained from the computation according to the frequency fv of the power voltage Vo and the computation cycle t. The comparator 27 structures determination means for determining whether or not the phase signal $\phi(t)$ in each computation cycle deviates by a predetermined value $|\Delta\phi|^*$ or more from the estimate value $\phi(t-1)+\Delta\phi(t)^*$.

Figure 2:
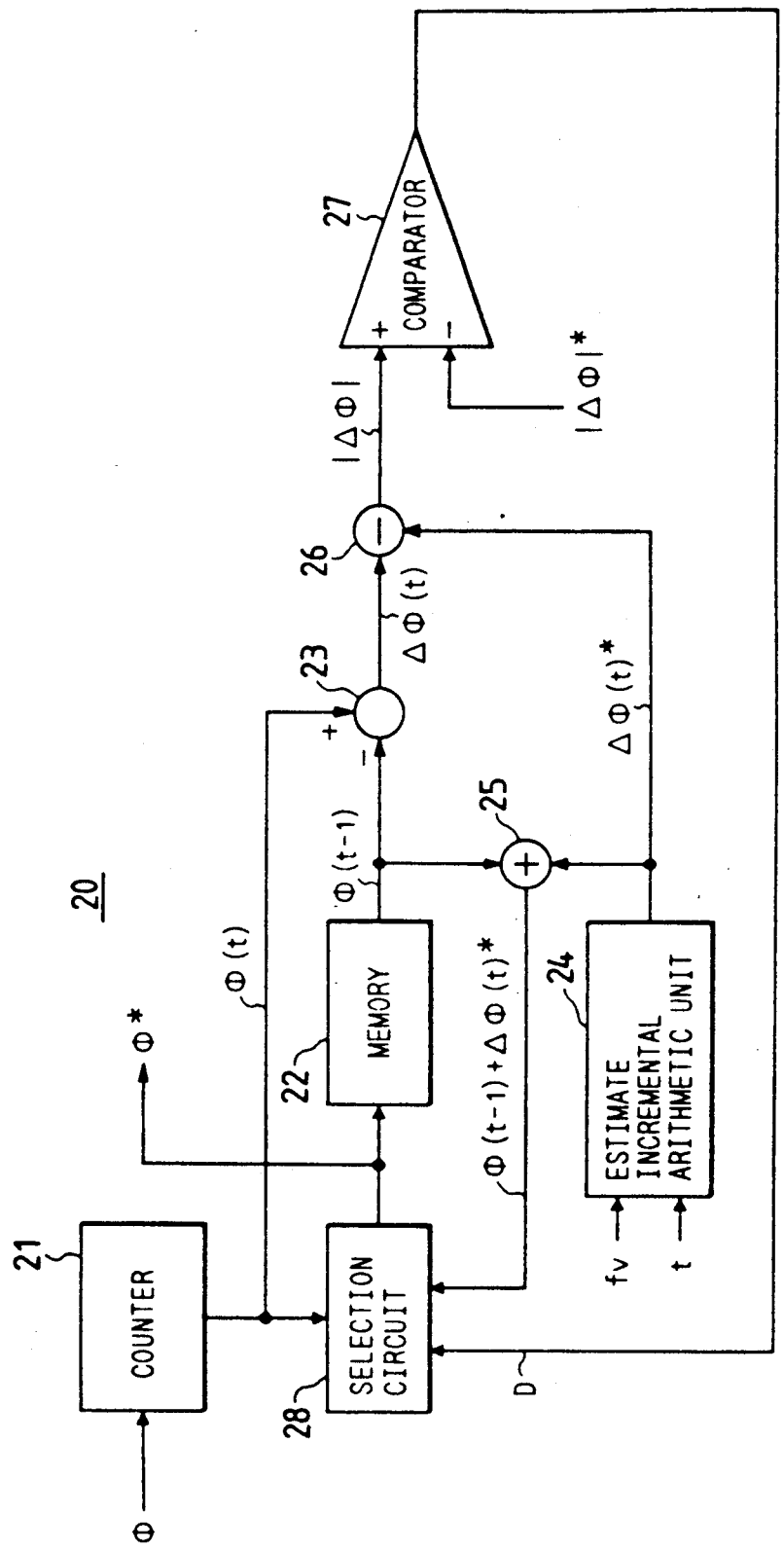
FIG. 2 is a functional block diagram showing the structure of an error detection protection device of FIG. 1.
Figure 3:
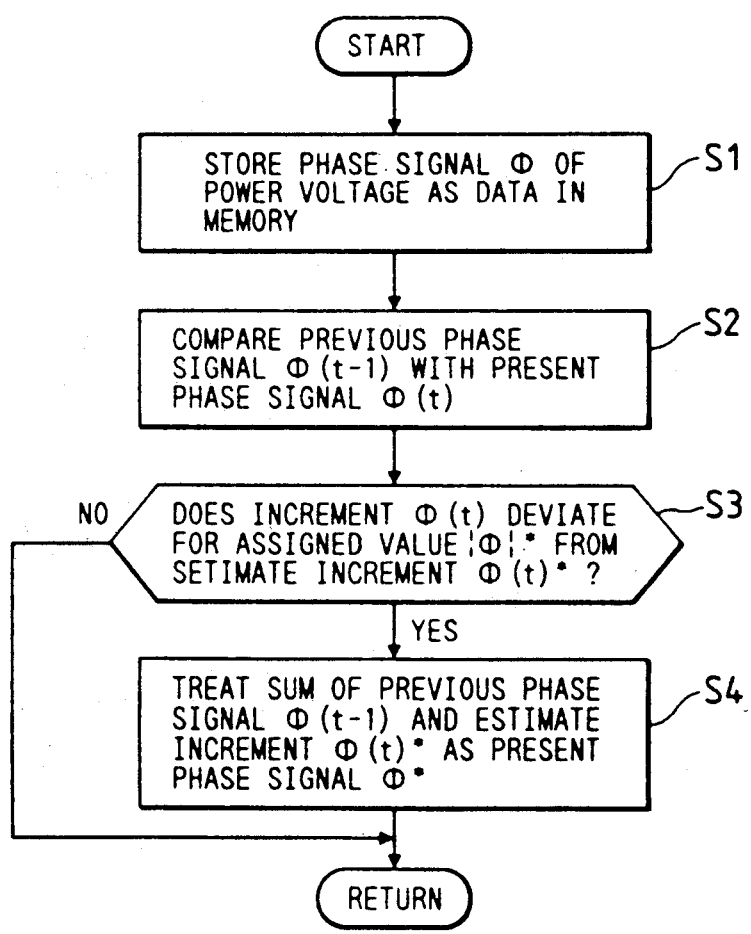
FIG. 3 is a flow chart describing the operation of FIG. 2.

FIG. 3 shows a flow chart representing the operation of the embodiment of the present invention shown in FIGS. 1 and 2. Since the operations of the structural elements other than the error detection protection device 20 are described above, they are omitted.

The phase signal $\phi$ of the power voltage Vo obtained in the PLL oscillator 12 is counted by the counter 21 in the error detection protection device 20. The resultant signal becomes data of the phase signal $\phi(t)$, which is incremented in each computation cycle and is input to the subtracter 23 and the selection circuit 28. In the initial state, since the memory does not store data and the comparator 27 does not generate a comparison output D, the initial phase signal $\phi(t_0)$ is stored in the memory 22 via the selection circuit 28 (in step S1).

When the counter 21 outputs the next phase signal $\phi(t)$, since them emory 22 has output the former phase signal $\phi(t_0)$, the subtracter 23 compares the phase signal $\phi(t_1)$ in the computation cycle $t_1$ with the phase signal $\phi(t_0)$ in the former computation cycle. The subtracter 23 computes the deviation between them using the following equation.

$$\phi(t_1)=\phi(t_1)-\phi(t_0)$$

After that, the subtracter 23 outputs the result as the increment $\Delta\phi(t_1)$ to the subtracter 26 (in step 2).

On the other hand, the estimate incremental arithmetic unit 24 obtains the estimate increment $\phi(t_1)^*$ according to the relationship between the frequency fv of the power voltage Vo and the computation cycle t and inputs it to the adder 25 and the subtracter 26.

The adder 25 inputs the sum $[\phi\text{the est}(t_0)+\Delta\phi(t_1)^*]$ of the former phase signal $\phi(t_0)$ and the estimate increment $\Delta\phi(t_1)^*$. The subtracter 26 compares the increment $\Delta\phi(t_1)$ with the estimate increment $\Delta\phi(t_1)^*$ and computes the absolute deviation between them using the following equation $$|\Delta\phi|=|\Delta\phi(t_1)-\Delta\phi(t_1)^*|$$

and inputs the result as the incremental deviation $|\Delta\phi|$ to a comparison terminal (+) of the comparator 27. The incremental deviation $|\Delta\phi|$ represents how the increment $\Delta\phi(t_1)$ of the phase signal deviates from the estimate increment $\Delta\phi(t_1)^*$. The predetermined value $|\Delta\phi|^*$ has been input to a reference terminal (−) of the comparator. The predetermined value $|\Delta\phi|^*$ has been set so that it is equal to the allowable maximum value of the incremental error $|\Delta\phi|$.

The comparator 27 compares the incremental deviation $|\Delta\phi|$ with the predetermined value $|\Delta\phi|^*$, determines whether or not the increment $\Delta\phi(t_1)$ deviates from the predetermined value $|\Delta\phi|^*$ or more from the estimate increment $\Delta\phi(t_1)^*$ (in step S3). When the incremental deviation $|\Delta\phi|$ is larger than the predetermined value $|\Delta\phi|^*$, the comparator 27 generates the comparison output D.

The selection circuit 28 selects the output $[\phi(t_0)+\Delta\phi(t_1)^*]$ of the adder 25 as the present phase signal $\phi^*$, outputs it to the sine wave generator 13, and stores it in the memory 22 (in step S4).

The data stored in the memory 22 is used for computing the next error detection determination. The data becomes the former phase signal $\phi(t-1)$ against the phase signal $\phi(t)$ in each computation cycle. At this time, the estimate incremental arithmetic unit 24 always the estimate increment $\Delta(t)$ in each computation cycle. The estimate increment $\Delta(t)$ is input to the adder 25 and the subtracter 26 so that it is used for computing the determination of an error detection.

On the other hand, in step S3, when it is determined that the incremental deviation $|\Delta\phi|$ does not exceed the predetermined value $|\Delta\phi|^*$, the selection circuit 28 outputs the phase signal $\phi(t)$ which is input from the counter 21 as the phase signal $\phi^*$.

As described above, when the error detection protection device 20 determines an error detection according to an abnormality of the increment $\Delta\phi(t)$ of the phase signal $\phi(t)$ in each computation cycle, it outputs the value which is commutated and compensated by the sum of the former phase signal $\phi(t-1)$ and the estimate increment $\Delta\phi(t)^*$ as the present phase signal $\phi^*$. Thus, even if an error of the phase signal $\phi$ is detected in the PLL oscillator 12, the abnormal phase signal is not input to the sine wave generator 13. Instead, the PWM signal generation circuit 19 always outputs the PWM signal P which precisely controls the transistors 3a to 3f. Consequently, it is not necessary to enlarge the size of the transistors 3a to 3f of the power converter 3 so that they can withstand an over current and thereby the apparatus can be provided at an inexpensive cost.

What is claimed is:

1. A PWM converter apparatus, comprising:
power converter means having a plurality of switching elements for converting a power voltage from an AC power supply into a DC voltage; and
control means which includes phase detection means for detecting the phase of said power voltage to generate a phase signal, and means for generating a PWM signal based on said phase signal to control said plurality of switching elements;
wherein said phase detection means has an error detection protection device for outputting an estimate value as a present phase signal when said phase signal of each computation cycle deviates by a predetermined value or more from said estimate value which is obtained according to a previous phase signal, a frequency of said power voltage and said computation cycle.

2. A PWM converter apparatus, comprising:
power converter means having a plurality of switching elements for converting a power voltage from an AC power supply into a DC voltage;
control means for controlling said plurality of switching elements having:
zero phase detection means for detecting a zero phase of a power voltage, and
means for generating a phase signal of the power voltage according to the zero phase;
means for generating a PWM signal based on said phase signal to control said plurality of switching elements; and
an error detection protection device for outputting an estimate value as a present phase signal when said phase signal of each computation cycle deviates from said estimate value by a predetermined value or more which is obtained according to a previous phase signal, a frequency of the power voltage and said computation cycle.

3. A PWM converter apparatus, comprising:
power converter means having a plurality of switching elements for converting a power voltage from an AC power supply into a DC voltage;
phase detection means for detecting the phase of said power voltage to generate a phase signal including:
counter means for counting the phase signal to output said phase signal in each computation cycle,
memory means for storing a previous phase signal obtained in a previous computation cycle,
subtractor means for obtaining a difference between the phase signal read in each computation cycle and said previous phase signal to output an increment,
estimate incremental arithmetic means for generating an estimate increment in each computation cycle according to the frequency of the power voltage in the computation cycle,
adder means for adding said previous phase signal in said estimate increment,
subtractor means for outputting an absolute value of the difference between said increment and said estimate increment as an incremental deviation,
comparative means for comparing said incremental deviation with a predetermined value, and
selection means for outputting one of the outputs from said counter means and said adder means as a present phase signal according to the output of said comparator means; and
means for generating a PWM signal based on said phase signal to control said plurality of switching elements.

4. An apparatus as claimed in claim 3, wherein said adder means outputs an estimate value of the phase signal obtained by computation according to the frequency of said power voltage and the computation cycle.

5. An apparatus as claimed in claim 3, wherein said comparator means forms determination means for determining whether the phase signal in each computation cycle deviates by said predetermined value or more from said estimate value.

* * * * *